(12) United States Patent
Kobayashi (10) Patent No.: US 6,657,763 B2
(45) Date of Patent: Dec. 2, 2003

(54) IMAGE DISPLAY APPARATUS AND SYSTEM (75) Inventor: Shuichi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/024,137

(22) Filed: Dec. 21, 2001

(65) Prior Publication Data

US 2002/0101643 A1 Aug. 1, 2002

(30) Foreign Application Priority Data

Dec. 26, 2000 (JP) ........................................ 2000-396209

(51) Int. Cl.$^7$ ............................................... G02B 26/08
(52) U.S. Cl. ...................................... 359/212; 359/208
(58) Field of Search .............................. 359/196–226, 359/726–731, 630–633, 833–834; 345/5–9, 32

(56) References Cited

U.S. PATENT DOCUMENTS

| | | | |
|---|---|---|---|
| 5,355,181 A | * 10/1994 | Ashizaki et al. | ............. 348/744 |
| 5,369,415 A | 11/1994 | Richard et al. | |
| 5,467,104 A | 11/1995 | Furness III et al. | |
| 6,081,304 A | * 6/2000 | Kuriyama et al. | .......... 348/838 |
| 6,333,820 B1 | 12/2001 | Hayakawa et al. | |
| 392,811 A1 | * 5/2002 | Lindau | ........................ 359/641 |

FOREIGN PATENT DOCUMENTS

| JP | 2874208 | 1/1999 |
|---|---|---|
| JP | 11-125791 | 5/1999 |
| JP | 2001-004955 | 1/2001 |

* cited by examiner

Primary Examiner—James Phan
(74) Attorney, Agent, or Firm—Fitzpatrick, Cella, Harper & Scinto (57) ABSTRACT

An image display apparatus includes a scanning unit for scanning a beam by driving a reflecting surface for reflecting a beam from a light source part; an optical element having an incident surface which the reflected beam from the scanning unit enters, at least one inner reflecting surface which has a curved surface and reflects the beam coming from the incident surface, and an exit surface from which the beam reflected by the inner reflecting surface emerges; and a reflecting element for reflecting the beam emerging from the optical element and guiding the beam to an observer's eye.

14 Claims, 8 Drawing Sheets

IMAGE DISPLAY APPARATUS AND SYSTEM

BACKGROUND OF THE INVENTION

1. Field of the Invention

The present invention relates to an image display apparatus for displaying an image formed by scanning a beam from a light source and, more particularly, to an image display apparatus suitable for scanning a beam by driving a reflecting surface using mechanical resonance.

2. Related Background Art

Various proposals including U.S. Pat. Nos. 5,355,181, 5,369,415, and 5,467,104, and Japanese Patent No. 2,874,208 have been made as an image display optical system (or image display apparatus) for forming an image on the observer's eye (retina) by scanning a beam from a light source.

Figure 9:
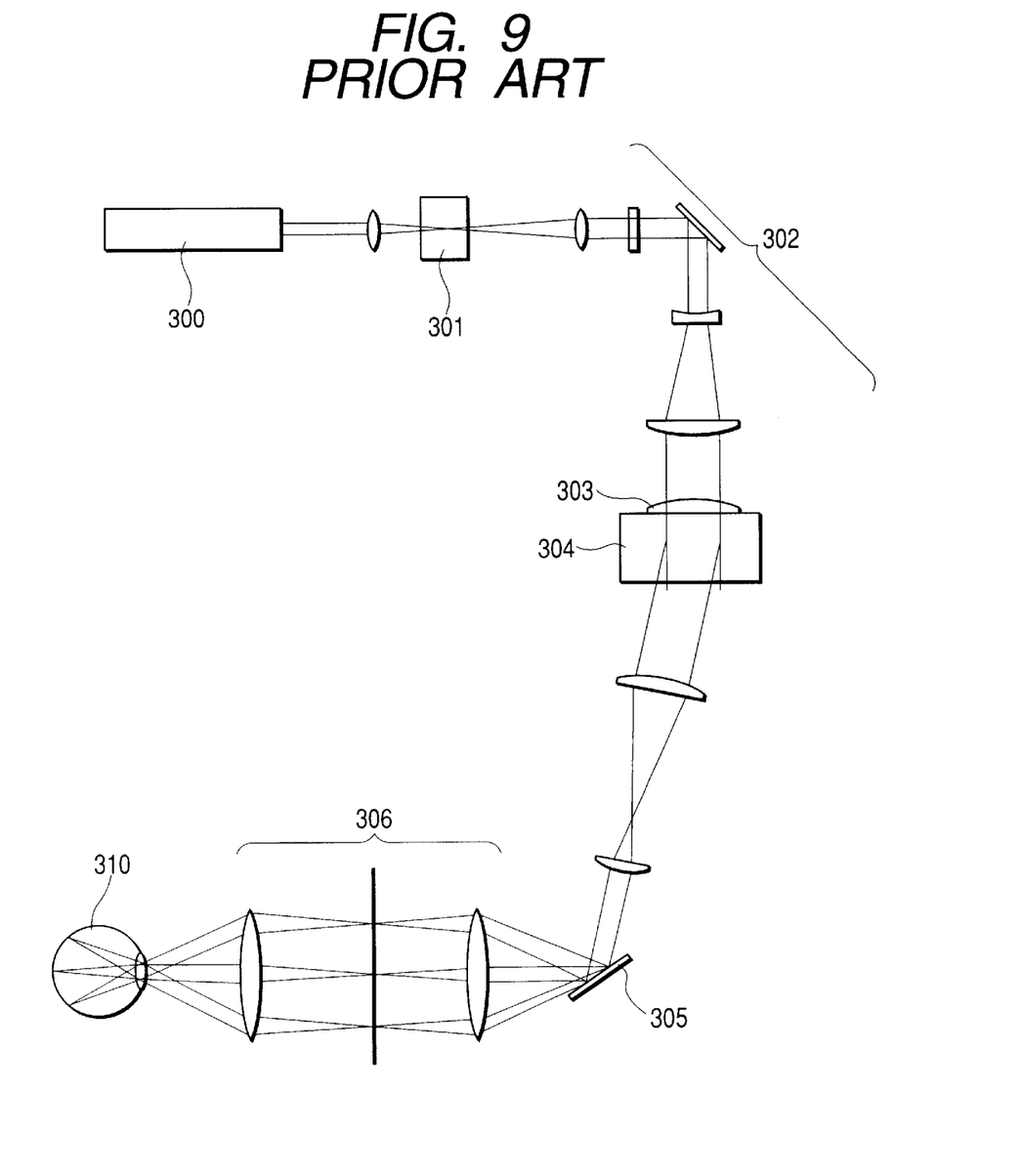
FIG. 9 is a view for explaining a conventional image display optical system.

FIG. 9 shows the arrangement of an image display optical system disclosed in U.S. Pat. No. 5,355,181. In this image display optical system, a beam from a light source 300 is modulated by an optical modulator 301, enters horizontal and vertical optical deflectors 304 and 305 via optical systems 302 and 303, and reaches an eye 310 via an eyepiece optical system 306 which constitutes a telescope system. The optical deflectors 304 and 305 deflect light incident on the eye 310 and scan an image formed on the retina. This allows the observer to observe a two-dimensional image.

Figure 10:
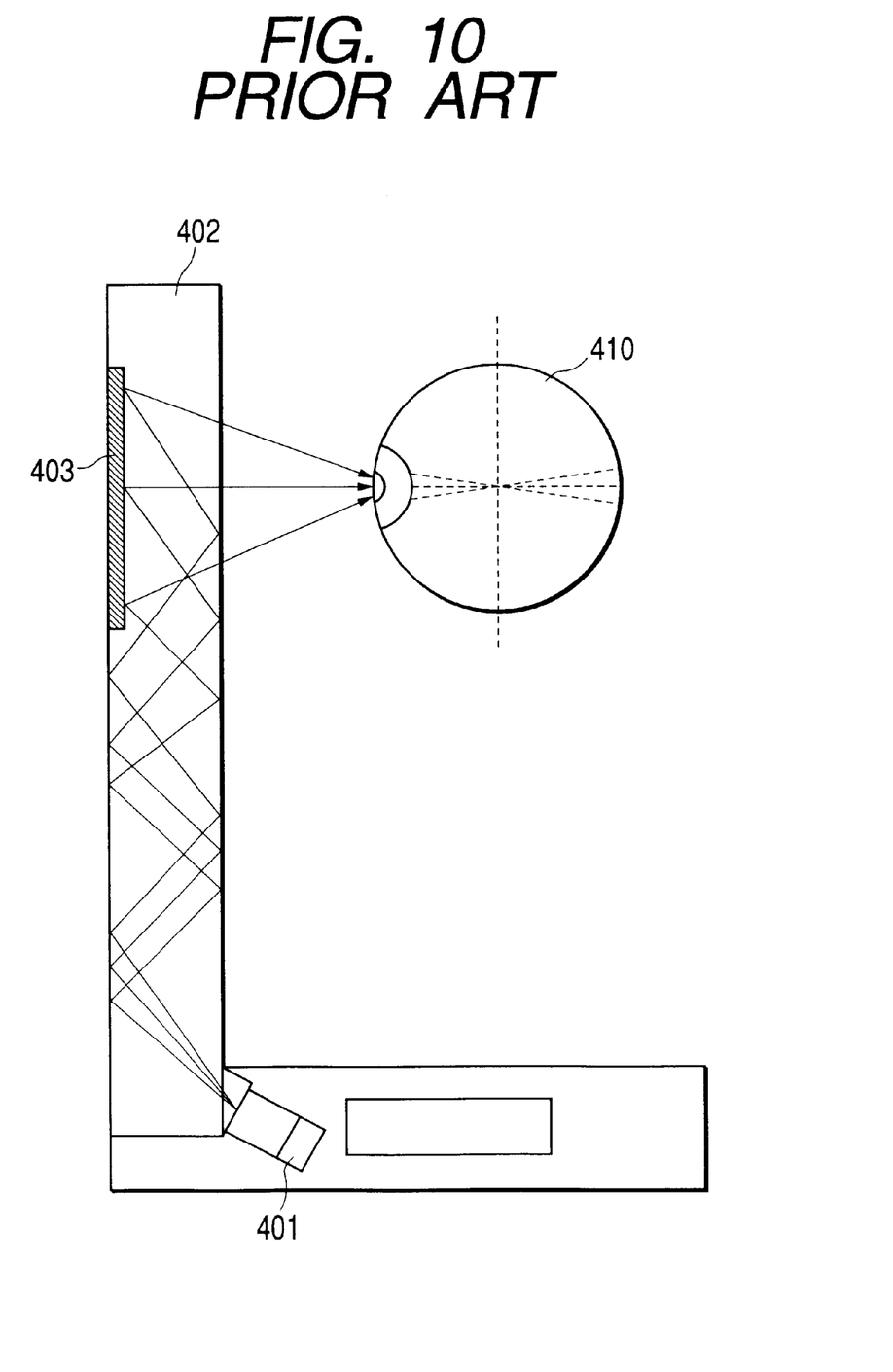
FIG. 10 is a view for explaining another conventional image display optical system.

FIG. 10 shows the arrangement of an image display optical system disclosed in U.S. Pat. No. 5,369,415. In this image display optical system, a two-dimensionally scanned beam from a light source 401 scans an eye (retina) 410 via a planar optical system 402. The beam to be scanned is sequentially reflected at a plurality of planar reflecting points within the planar optical system 402, and its optical path is changed toward the eye by a diffraction optical system 403. With this arrangement, the diffracted beam directly scans the retina 410 to enable observing an image.

Figure 11:
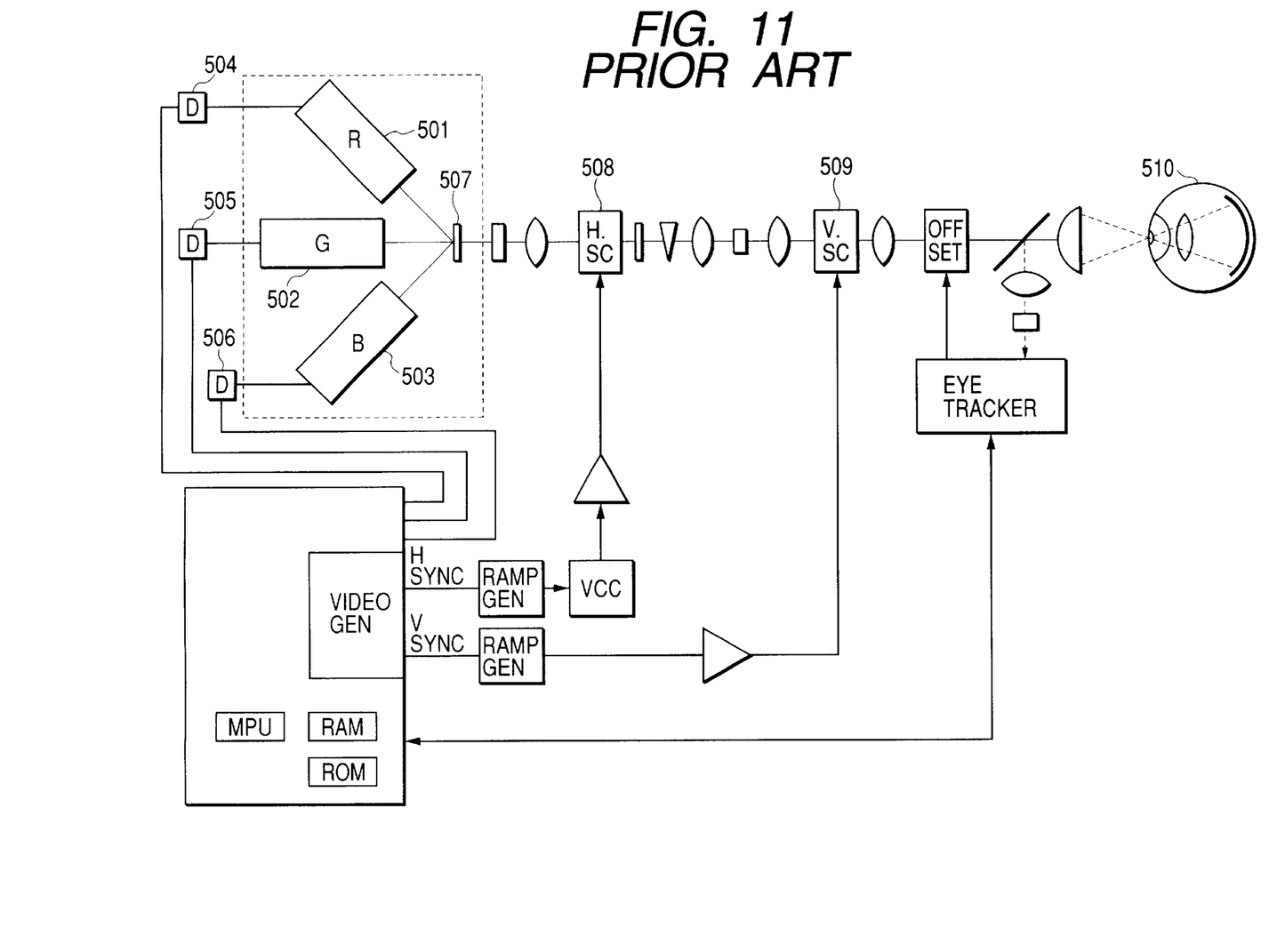
FIG. 11 is a block diagram for explaining still another conventional image display optical system.

FIG. 11 shows the arrangement of an image display optical system disclosed in U.S. Pat. No. 5,467,104. In this image display optical system, red, green, and blue light sources 501, 502, and 503 are modulated by light source drivers 504, 505, and 506, and beams from these light sources are combined by a color combining means 507. The combined beam from the light sources passes through the pupil of an eye 510 via an optical system interposed between the color combining means 507 and the eye 510, and is guided on the retina. Vertical and horizontal scanning means 508 and 509 are arranged between the eye and the light sources via an optical system, and scan the beam on the retina.

Figure 12A:
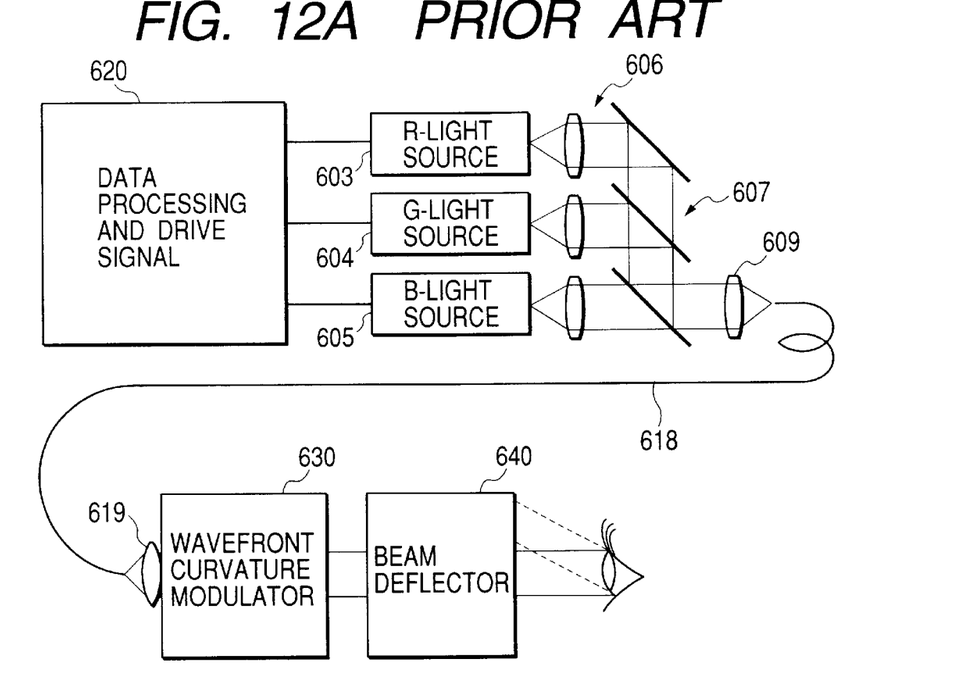
FIGS. 12A and 12B are views for explaining still another conventional image display optical system.
Figure 12B:
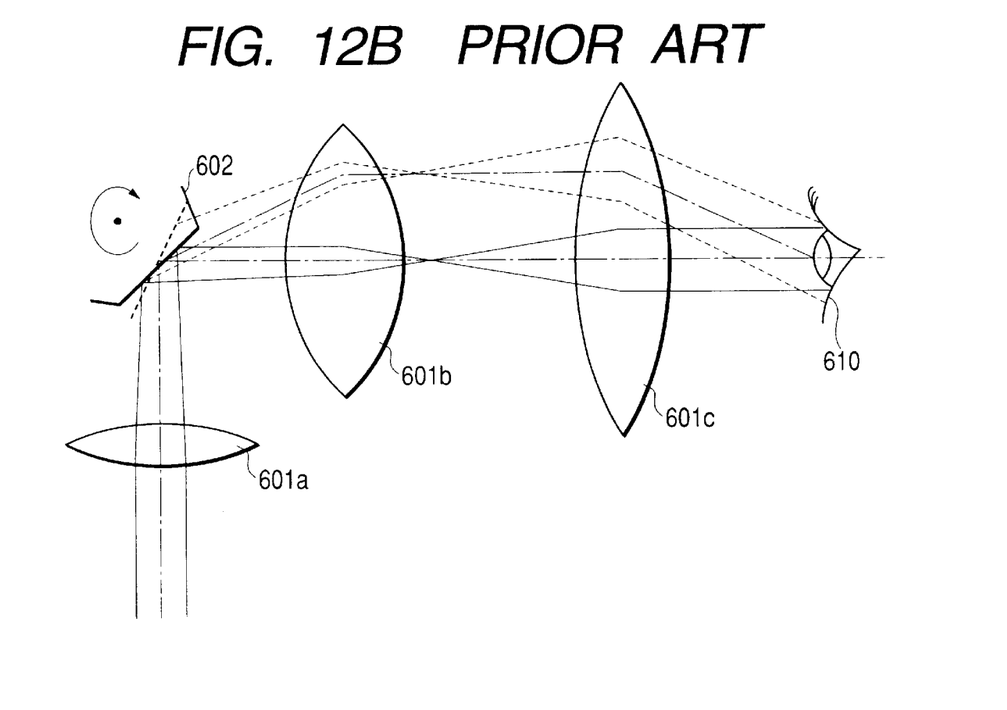

FIGS. 12A and 12B show the arrangement of an image display optical system disclosed in Japanese Patent No. 2,874,208. As shown in FIG. 12B, a beam from a light source is deflected by a deflection means 602 comprising a polygon mirror, and enters an eye 610 via optical systems 601b and 601c. FIG. 12A shows an arrangement on the optical path from the light source to the eye. Beams from light sources 603, 604, and 605 driven by a data processing and drive signal 620 enter an optical fiber 618 via collimator lenses 606, color combining systems 607, and a lens 609. After passing through the optical fiber 618, the beam further passes through a wavefront curvature modulator 630 and beam deflector 640 via a lens 619, and reaches the eye 610.

These conventional image display optical systems display a two-dimensional image to the observer by forming light from a light source into an image on the retina serving as an image plane and scanning the image point by a scanning means inserted in the optical path.

An apparatus for displaying a two-dimensional image to the observer is, e.g., a liquid crystal panel which enlarges and displays a two-dimensional image as a virtual image via an optical system. To display a finer image, this arrangement requires a larger number of pixels of the image display element. However, a small-size image display element with many pixels is high in cost, increasing the cost of the whole apparatus.

Of the scanning image display apparatuses described above, those disclosed in U.S. Pat. Nos. 5,355,181 and 5,467,104 and Japanese Patent No. 2,874,208 use many lenses, which readily makes the optical system or apparatus bulky.

The image display apparatus disclosed in U.S. Pat. No. 5,369,415 has a relatively simpler arrangement using a flat optical system. However, light is diffracted to the observer's eye by only the diffraction optical element in front of the eye, so aberration may become difficult to correct for high image quality. Thus, the field angle is difficult to increase.

Japanese Patent No. 2,874,208 adopts a polygon mirror as a deflection (scanning) means, and the deflection means and whole apparatus become bulky.

SUMMARY OF THE INVENTION

It is an object of the present invention to provide a small-size, low-cost scanning image display apparatus with a simple arrangement that realizes high-speed beam scan.

To achieve the above object, an image display apparatus according to the present invention comprises scanning unit for scanning a beam by driving a reflecting surface for reflecting a beam from the light source part, an optical element having an incident surface which the reflected beam from the scanning unit enters, at least one inner reflecting surface which has a curved surface and reflects the beam coming from the incident surface, and an exit surface from which the beam reflected by the inner reflecting surface emerges, and a reflecting element for reflecting the beam emerging from the optical element and guiding the beam to an observer's eye.

Since a beam emitted by the light source unit is scanned by the scanning unit, the prevent invention can provide an image display apparatus which can easily increase the scanning speed and is suitable for displaying a fine image.

The use of the optical element with at least one inner reflecting surface enables deflecting the optical path and easily downsizing the apparatus. Since a beam emitted by the optical element is guided to the eyeball via the reflecting element, the degree of freedom for the layout of the optical system can be increased.

For example, the scanning unit and optical element are arranged on the side of the head with respect to the reflecting element positioned in front of the observer's eye so as to prevent the observer from feeling uncomfortable. The present invention can implement a scanning image display apparatus which can be used comfortably as if the observer wore glasses.

The inner reflecting surface of the optical element is formed into a curved surface. This structure can satisfactorily correct aberrations such as decentering aberration which readily occur owing to an optical layout capable of guiding a beam from the side of the head to the eyeball via the reflecting element in front of the eye. Accordingly, a high-quality image can be displayed.

The scanning unit is a device which utilizes an MEMS (Micro Electro Mechanical System) technique, is manufactured by a semiconductor process, and has a reflecting surface driven by mechanical resonance. The scanning unit itself can be downsized, scanning can be done at a very high speed, and a smaller-size image display apparatus capable of displaying a fine image can be implemented.

If the beam scanning angle of the scanning unit is enlarged by an optical system made up of an optical element and reflecting element, an image larger than the scanning angle of the scanning unit can be observed.

DESCRIPTION OF THE PREFERRED EMBODIMENTS (First Embodiment)

Figure 1:
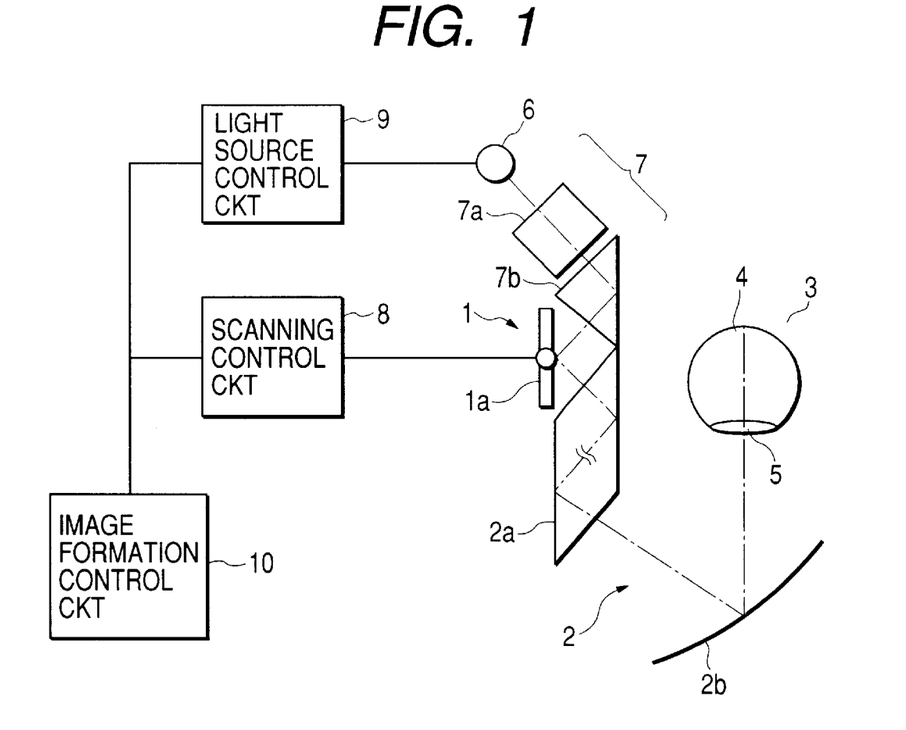
FIG. 1 is a schematic view showing the arrangement of an optical system in an image display apparatus according to the first embodiment of the present invention.
Figure 3:
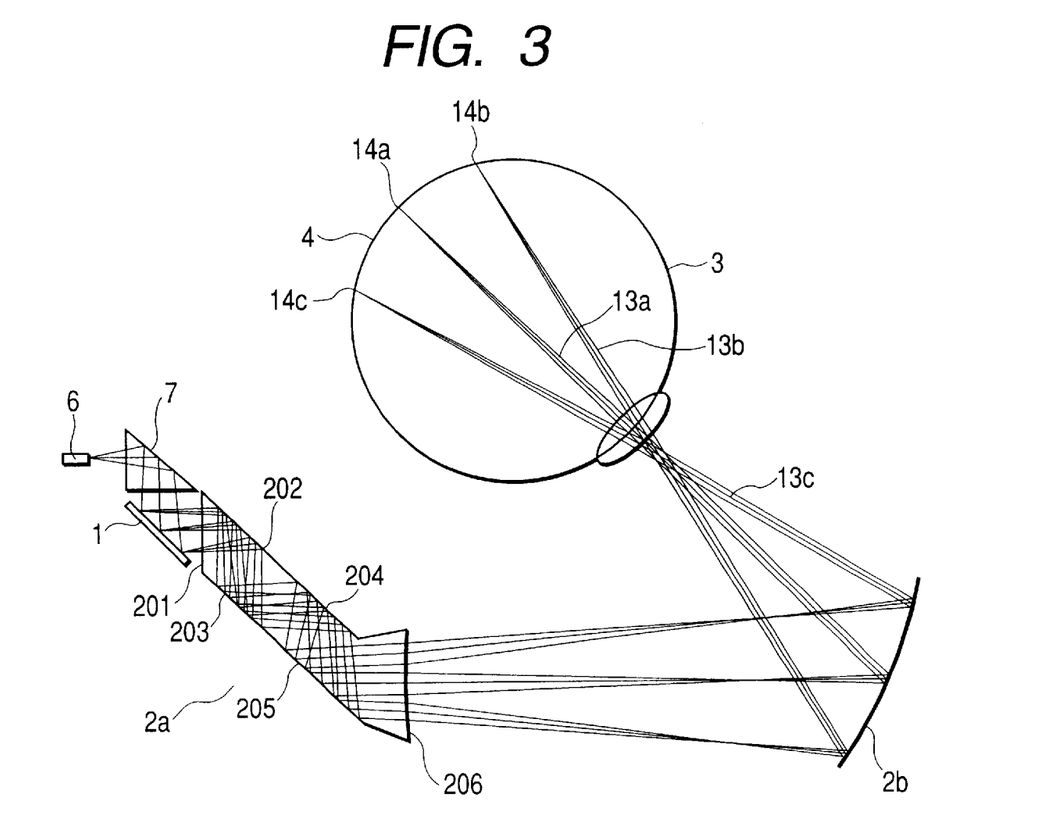
FIG. 3 is a view showing the optical path of the optical system in the first embodiment.

FIG. 1 shows the schematic arrangement of an optical system in an image display apparatus according to the first embodiment of the present invention. FIG. 3 is a view showing the optical path of the optical system.

In FIGS. 1 and 3, emission of a light-emitting member 6 such as an LED or semiconductor laser is controlled by a light source control circuit 9. A light guide unit 7 is made up of a collimator element 7a for (substantially) collimating a beam emitted by the light-emitting member 6, and a light guide prism 7b for guiding the beam emerging from the collimator element 7a to a scanning element 1 (to be described later) by inner reflection. The light-emitting member 6 and light guide unit 7 constitute a light source part.

In the first embodiment, the scanning element (scanning unit) 1 is a device manufactured by a semiconductor process. This can realize a smaller size than the use of a polygon mirror or the like.

The scanning element 1 is connected to a scanning control circuit 8. A planar mirror 1a of the scanning element 1 is swung and driven by an electrical signal from the scanning control circuit 8 at a high speed and a large angle by mechanical resonance.

Figure 2:
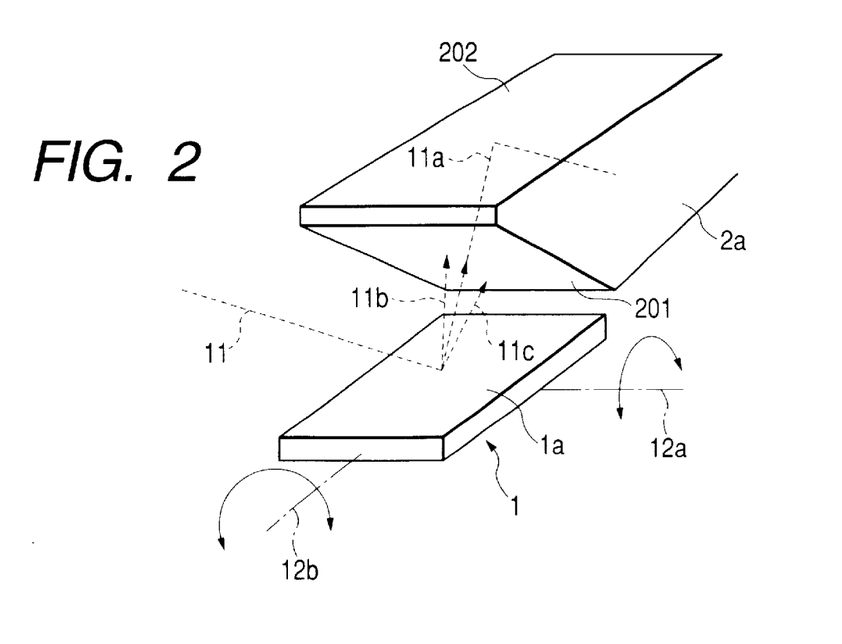
FIG. 2 is a schematic view showing the arrangement of a scanning element which constitutes the optical system in the first embodiment.

The arrangement and optical operation of the scanning element 1 will be generally described with reference to FIG. 2.

In the scanning element 1, a swingably supported movable plate is formed on a semiconductor substrate (not shown), and the planar mirror 1a is attached to the movable plate. Although not shown, a permanent magnet is attached to the substrate, and a coil, to the movable plate. The movable plate (i.e., planar mirror 1a) can be swung and driven by the operation of a magnetic field generated by controlling energization to the coil. The movable plate is changed to a mechanically resonant state, and the planar mirror 1a can be swung and driven at a high speed and a large angle.

The planar mirror 1a is swingable in two directions about horizontal and vertical scanning axes 12a and 12b perpendicular to each other. For example, when the planar mirror 1a swings about the axis 12a, the reflected beam of a beam 11 incident on the planar mirror 1a is deflected into beams 11a, 11b, and 11c in accordance with the swing angle. Similarly, when the planar mirror 1a swings about the axis 12b, the reflected beam is deflected in a direction perpendicular to the deflection direction of the reflected beams 11a, 11b, and 11c. That is, a beam can be two-dimensionally deflected by swing of the planar mirror 1a.

A display optical system 2 is comprised of a prism-shaped optical element 2a and reflecting element 2b. As shown in detail in FIG. 3, the optical element 2a has an incident surface 201, an exit surface 206, and four inner reflecting surfaces 202 to 205.

Some or all of the optical element 2a, collimator element 7a, and light guide prism 7b may be constituted as an integral element. It is noted that the optical system exemplified in FIG. 3 is constructed such that the inner reflecting surfaces are made up of concave surfaces to integrally constitute the collimator element 7a and the light guide prism 7b so as to construct the light guide unit 7 as a single element.

In FIG. 3, a beam reflected by the planar mirror 1a enters the optical element 2a via the incident surface 201.

The reflecting element 2b reflects the beam emerging from the optical element 2a and guides it to the observer's eye.

Although not shown, all the building components (light-emitting member 6 to reflecting element 2b) of the above-described optical system are held by a mount member which can be mounted on the observer's head, like glasses. When the reflecting element 2b is set in front of an observer's eye 3, the remaining building components (light-emitting member 6 to optical element 2a) are disposed as a unit on the side of the observer's head. The reflecting element 2b is held at a position of the mount member that corresponds to a portion where the lenses of glasses are held, whereas the light-emitting member 6 to optical element 2a are held at a position corresponding to the temple of the mount member.

In the optical system of FIG. 3 having this arrangement, a beam emitted by the light-emitting member 6 is substantially collimated by the internal reflecting surface of the light guide unit 7.

The beam emerging from the light guide unit is two-dimensionally scanned by the scanning element 1, passes through the incident surface 201 of the optical element 2a, and enters the optical element 2a. The beam incident on the optical element 2a is sequentially reflected by the inner reflecting surfaces 202, 203, 204, and 205, and emerges from the exit surface 206.

The beam emerging from the optical element 2a is reflected by the reflecting element 2b to reach the observer's eye 3. The beam incident on the observer's eye 3 forms an image on a retina 4.

The light source control circuit 9 and scanning control circuit 8 are connected to an image formation control circuit 10 for receiving a video signal from an image information supply apparatus (not shown) such as a television, videocassette recorder, DVD player, or computer. The image formation control circuit 10 controls the light source control circuit 9 and scanning control circuit 8 (i.e., emission of the light-emitting member 6 and energization to the optical scanning element 1) so as to synchronize these circuits in correspondence with a supplied video signal.

The image display apparatus of this embodiment and the above image information supply apparatus constitute an image display system.

Scanning of a beam (imaging point) on the retina 4 will be explained with reference to FIG. 3. Assuming that a beam 13a when the planar mirror 1a of the optical scanning element 1 is at an initial position (swing angle: 0) forms an image at an imaging point 14a on the retina 4, optical paths 13b and 13c when the planar mirror 1a swings from the initial position correspond to imaging points 14b and 14c. This scanning of the imaging point is two-dimensionally performed by swinging the planar mirror 1a in the two-dimensional direction.

Scanning of the imaging point is executed in synchronism with control of the emission intensity of the light-emitting member 6 that corresponds to a supplied video signal. Accordingly, an image corresponding to the video signal is formed on the observer's retina 4.

The display optical system made up of the optical element 2a and reflecting element 2b increases the beam scanning angle of the scanning element 1. This enables observing an image having a field angle larger than the scanning angle of the scanning element 1 (planar mirror 1a).

As described above, this embodiment employs the scanning element 1 whose reflecting surface reciprocates by mechanical resonance, and can downsize the scanning means. Further, the overall apparatus can be downsized because the optical path is deflected a plurality of times by the planar mirror 1a of the scanning element 1 and the inner reflecting surfaces of the optical element 2a.

To display a video signal from a television or videocassette recorder, the horizontal and vertical scanning frequencies are greatly different from each other. In this case, at least a side which requires a higher scanning speed is driven by mechanical resonance.

In this embodiment, the reflecting element 2b is tilted from the optical axis of the eye 3 in order to guide a beam traveling from the side of the eye 3 to the eye 3. This readily generates decentering aberration in the reflecting element 2b. However, aberrations such as decentering aberration can be satisfactorily corrected by shaping any one of the inner reflecting surfaces 202 to 205 of the optical element 2a into a rotationally asymmetrical curved surface (a curved surface with no rotational symmetry or a curved surface with a symmetry plane of 1 or less that defines a pair of symmetrical curved surfaces), and shaping the reflecting surface of the reflecting element 2b into a rotationally asymmetrical curved surface (a curved surface with no rotational symmetry or a curved surface with a symmetry plane of 1 or less that defines a pair of symmetrical curved surfaces).

In this embodiment, the light-emitting member 6 and scanning element 1 may be provided on a single substrate, and the elements 7a and 7b of the light guide unit 7 and the optical element 2a may be constituted as an integral optical element unit. In this case, the optical element unit can be so assembled as to cover the substrate.

Figure 4:
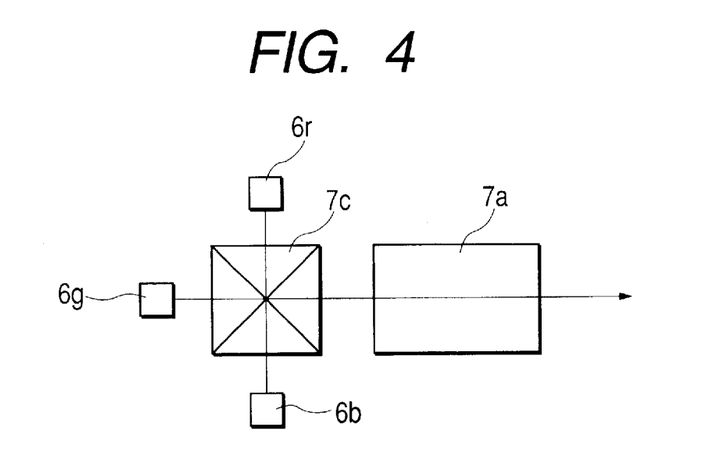
FIG. 4 is a view showing a modification of a light source part in the first embodiment.

This embodiment has exemplified one light-emitting member 6 (one color). Alternatively, as shown in FIG. 4, light-emitting members 6r, 6b, and 6g for emitting beams of three, red, blue, and green colors are arranged. Beams from the light-emitting members 6r, 6b, and 6g are combined by a color combining element 7c such as a dichroic prism, and guided to the scanning element 1 and display optical system 2. In this case, a color image can be obtained.

The arrangement of the scanning element 1 described in the first embodiment is merely an example, and another arrangement can be adopted as far as the optical scanning element 1 can be manufactured by a semiconductor process.

(Second Embodiment)

Figure 5:
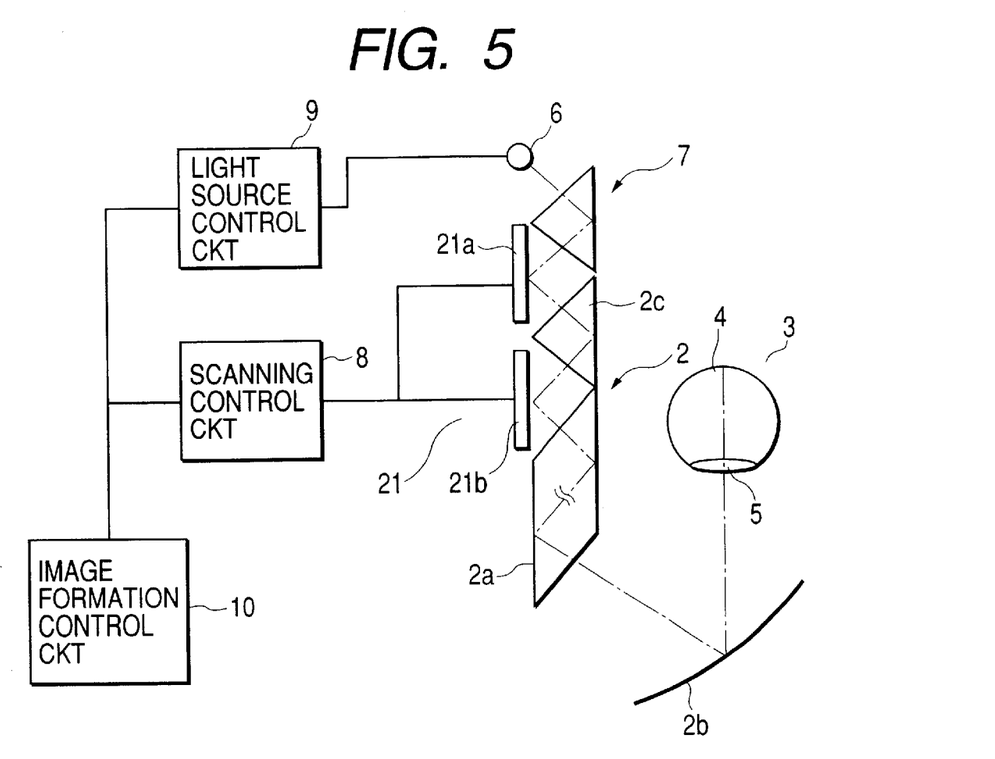
FIG. 5 is a schematic view showing the arrangement of an optical system in an image display apparatus according to the second embodiment of the present invention.
Figure 7:
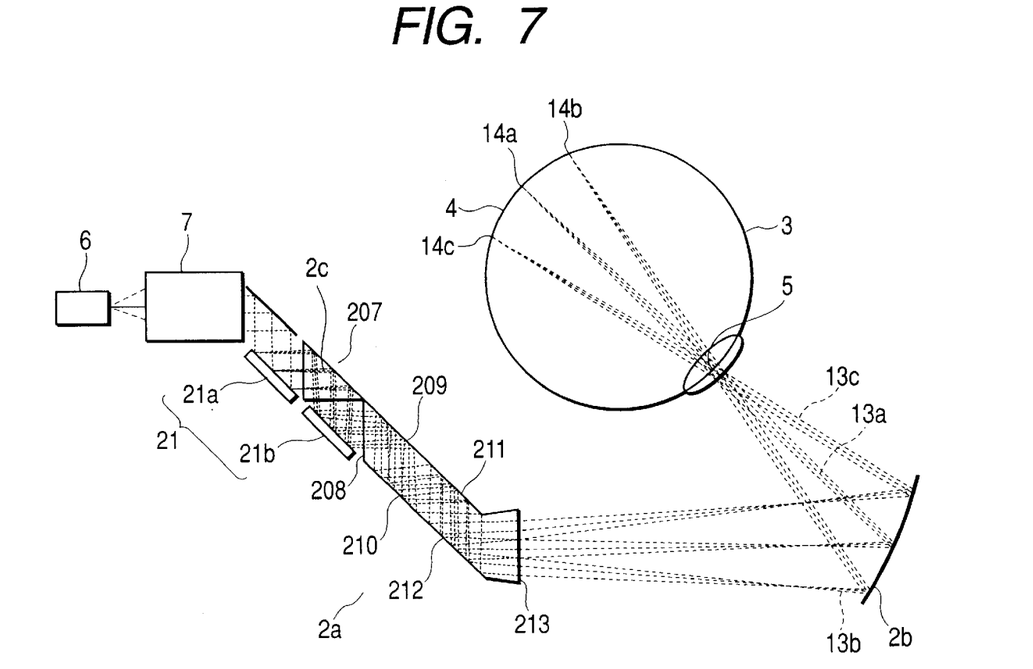
FIG. 7 is a view showing the optical path of the optical system in the second embodiment.

FIG. 5 shows the schematic arrangement of an optical system in an image display apparatus according to the second embodiment of the present invention. FIG. 7 is a view showing the optical path of the optical system.

In FIGS. 5 and 7, emission of a light-emitting member 6 such as an LED or semiconductor laser is controlled by a light source control circuit 9. A light guide unit 7 (substantially) collimates a beam emitted by the light-emitting member 6, and guides the beam to the first scanning element (to be described later). The light-emitting member 6 and light guide unit 7 constitute a light source part.

In the second embodiment, a scanning unit 21 is a device manufactured by a semiconductor process. This can realize a smaller size than the use of a polygon mirror or the like.

The scanning unit 21 is made up of a first scanning element having a planar mirror 21a swingable about the horizontal scanning axis, and a second scanning element having a planar mirror 21b swingable about the vertical scanning axis.

These scanning elements are connected to a scanning control circuit 8. The planar mirrors 21a and 21b of the scanning elements are swung and driven by an electrical signal from the scanning control circuit 8. Since the planar mirror 21a particularly requires high-speed driving, mechanical resonance is used.

Figure 6:
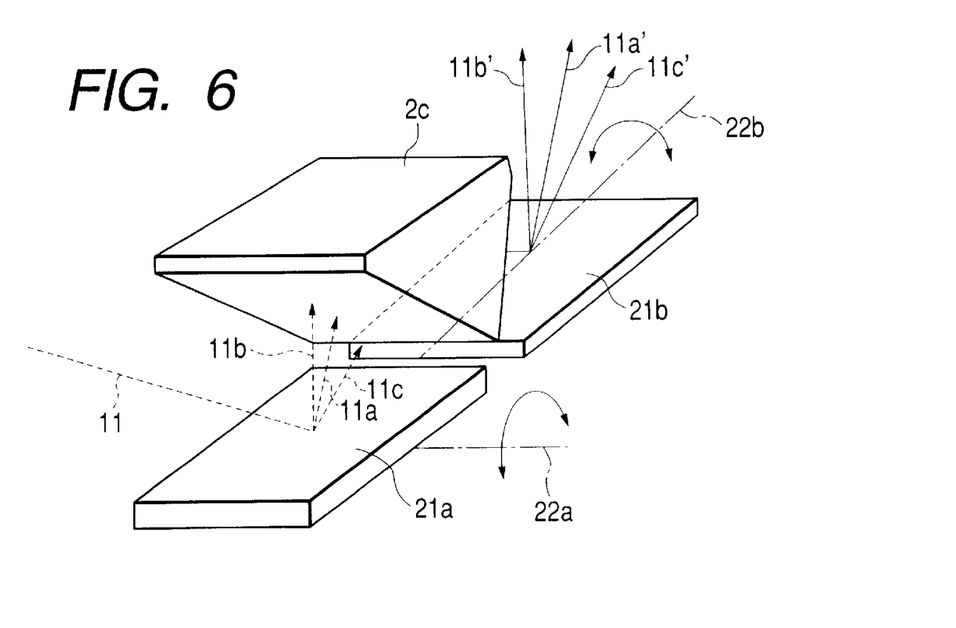
FIG. 6 is a schematic view showing the arrangement of a scanning element which constitutes the optical system in the second embodiment.

The arrangement and optical operation of the first and second optical scanning elements will be generally described with reference to FIG. 6.

In the first scanning element, a swingably supported movable plate is formed on a semiconductor substrate (not shown), and the planar mirror 21a is attached to the movable plate. Although not shown, a permanent magnet is attached to the substrate, and a coil, to the movable plate. The movable plate (i.e., planar mirror 21a) is swung and driven by the operation of a magnetic field generated by controlling energization to the coil. The movable plate is changed to a mechanically resonant state, and the planar mirror 21a can be swung and driven at a high speed and a large angle.

The planar mirror 21a is swingable about a horizontal scanning axis 22a. When the planar mirror 21a swings about the axis 22a, the reflected beam of a beam 11 incident on the planar mirror 21a is deflected into beams 11a, 11b, and 11c in accordance with the swing angle.

The beams 11a, 11b, and 11c enter an intermediate element 2c interposed between the first and second scanning elements. The beams 11a, 11b, and 11c are reflected by the inner reflecting surface of the intermediate element 2c, and guided to the second scanning element.

In the second scanning element, similar to the first scanning element, a swingably supported movable plate is formed on a semiconductor substrate (not shown), and the planar mirror 21b is attached to the movable plate. Although not shown, a permanent magnet is attached to the substrate, and a coil, to the movable plate. The movable plate (i.e., planar mirror 21b) is swung and driven by the operation of a magnetic field generated by controlling energization to the coil. The movable plate is changed to a mechanically resonant state, and the planar mirror 21b can be swung and driven at a high speed and a large angle.

The planar mirror 21b is swingable about a vertical scanning axis 22b. When the planar mirror 21b swings about the axis 22b, the reflected beam of a beam which enters the planar mirror 21b from the intermediate element 2c is deflected into beams 11a', 11b', and 11c' in accordance with the swing angle.

A beam can be two-dimensionally deflected by swing of the planar mirrors 21a and 21b in the first and second scanning elements having this arrangement.

A display optical system 2 comprises the prism-shaped intermediate element 2c, a prism-shaped optical element 2a, and a reflecting element 2b. As shown in detail in FIG. 7, the intermediate element 2c has an incident surface, exit surface, and inner reflecting surface 207. The optical element 2a has an incident surface 208, an exit surface 213, and four inner reflecting surfaces 209 to 212.

Some or all of the optical element 2a, the elements of the light guide unit 7, and the intermediate element 2c may be constituted as an integral element.

In FIG. 7, a beam reflected by the planar mirror 21a enters the optical element 2a via the incident surface 208.

The reflecting element 2b has a concave surface facing the observer's eye in order to reflect the beam emerging from the optical element 2a and guide it to the observer's eye.

Although not shown, all the building components (light-emitting member 6 to reflecting element 2b) of the above-described optical system are held by a mount member which can be mounted on the observer's head, like glasses. When the reflecting element 2b is set in front of an observer's eye 3, the remaining building components (light-emitting member 6 to optical element 2a) are disposed as a unit on the side of the observer's head. The reflecting element 2b is held at a position of the mount member that corresponds to a portion where the lenses of glasses are held, whereas the light-emitting member 6 to optical element 2a are held at a position corresponding to the temple of the mount member.

In the image display apparatus having this arrangement, a beam emitted by the light-emitting member 6 is substantially collimated by the light guide unit 7, and enters the planar mirror 21a of the first scanning element where the beam is horizontally deflected to reach the intermediate element 2c.

The beam incident on the intermediate element 2c is reflected by the inner reflecting surface 207, and emerges to the second scanning element. The beam enters the planar mirror 21b of the second scanning element where the beam is vertically deflected to reach the optical element 2a via the incident surface 208 of the optical element 2a. The beam incident on the optical element 2a is sequentially reflected by the inner reflecting surfaces 209, 210, 211, and 212, and emerges from the exit surface 213.

The beam emerging from the optical element 2a is reflected by the reflecting element 2b to reach the observer's eye 3. The beam incident on the observer's eye 3 forms an image on a retina 4.

The light source control circuit 9 and scanning control circuit 8 are connected to an image formation control circuit 10 for receiving a video signal from an image information supply apparatus (not shown) such as a television, video-cassette recorder, DVD player, or computer. The image formation control circuit 10 controls the light source control circuit 9 and scanning control circuit 8 (i.e., emission of the light-emitting member 6 and energization to the first and second scanning elements) so as to synchronize these circuits in correspondence with a supplied video signal.

The image display apparatus of this embodiment and the above image information supply apparatus constitute an image display system.

Scanning of a beam (imaging point) on the retina 4 will be explained with reference to FIG. 7. Assuming that a beam 13a when the planar mirror 21a of the first scanning element is at an initial position (swing angle: 0) forms an image at an imaging point 14a on the retina 4, optical paths 13b and 13c when the planar mirror 21a swings from the initial position correspond to imaging points 14b and 14c. This scanning of the imaging point is two-dimensionally performed by swinging the planar mirror 21a in the two-dimensional direction.

Scanning of the imaging point is executed in synchronism with control of the emission intensity of the light-emitting member 6 that corresponds to a supplied video signal. Accordingly, an image corresponding to the video signal is formed on the observer's retina 4.

The display optical system made up of the optical element 2a and reflecting element 2b increases the beam scanning angles of the first and second scanning elements. This enables observing an image having a field angle larger than the scanning angles of the first and second scanning elements (planar mirrors 21a and 21b).

As described above, according to the second embodiment, the first and second scanning elements are scanning units manufactured by a semiconductor process, so that the scanning unit can be downsized. In particular, to display an image at different horizontal and vertical scanning speeds, like a television or video image, the mirror is effectively vibrated by mechanical resonance to a side which requires higher-speed scanning.

In addition, the overall apparatus can be downsized because the optical path is deflected a plurality of number of times by the planar mirrors 21a and 21b of the two scanning elements and the inner reflecting surfaces of the optical element 2a.

In this embodiment, the reflecting element 2b is tilted from the optical axis of the eye 3 in order to guide a beam traveling from the side of the eye 3 to the eye 3. This readily generates decentering aberration in the reflecting element 2b. However, aberrations such as decentering aberration can be satisfactorily corrected by shaping any one of the inner reflecting surfaces 209 to 212 of the optical element 2a into a rotationally asymmetrical curved surface (a curved surface with no rotational symmetry or a curved surface with a symmetry plane of 1 or less that defines a pair of symmetrical curved surfaces), and shaping the reflecting surface of the reflecting element 2b into a rotationally asymmetrical curved surface (a curved surface with no rotational symmetry or a curved surface with a symmetry plane of 1 or less that defines a pair of symmetrical curved surfaces). The reflecting element 2b has a concave surface facing the observer's eye, but the same effects can also be attained by, e.g., a reflecting hologram exhibiting the same operation.

In this embodiment, the light-emitting member 6 and the first and second scanning elements may be provided on a single substrate, and the elements of the light guide unit 7, the optical element 2a, and the intermediate element 2c may be constituted as an integral optical element unit. In this case, the optical element unit can be so assembled as to cover the substrate.

Figure 8:
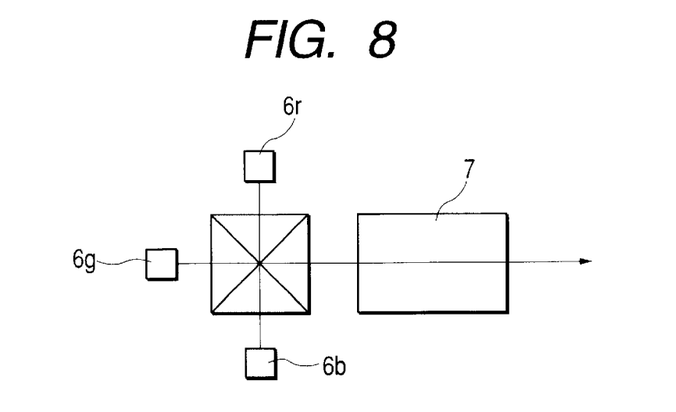
FIG. 8 is a view showing a modification of a light source part in the second embodiment.

This embodiment has exemplified one light-emitting member 6 (one color). Alternatively, as shown in FIG. 8, light-emitting members 6r, 6b, and 6g for emitting beams of red, blue, and green colors are arranged. Beams from the light-emitting members 6r, 6b, and 6g are combined by a color combining element 7c such as a dichroic prism, and guided to the first and second scanning elements and the display optical system 2. In this case, a color image can be obtained.

The arrangements of the first and second scanning elements described in the second embodiment are merely examples, and other arrangements can be adopted as far as the first and second scanning elements can be manufactured by a semiconductor process.

The arrangements of the first and second scanning elements described in the second embodiment are merely an example, and another arrangement can be adopted as far as the first and second scanning elements can be manufactured by a semiconductor process.

According to the first and second embodiments described above, a beam emitted by the light source unit is scanned by the scanning unit. These embodiments can provide an image display apparatus which can easily increase the scanning speed and is suitable for displaying a fine image.

The use of the optical element with at least one inner reflecting surface enables deflecting the optical path and easily downsizing the apparatus. Since a beam emitted by the optical element is guided to the eyeball via the reflecting element, the degree of freedom for the layout of the optical system can be increased. For example, the light source unit, scanning unit, and optical element can be arranged on the side of the head with respect to the reflecting element positioned in front of the observer's eye so as to prevent the observer from feeling uncomfortable. The embodiments can implement a scanning image display apparatus which can be used comfortably as if the observer wore glasses.

The inner reflecting surface of the optical element is formed into a curved surface. This structure can satisfactorily correct aberrations such as decentering aberration which readily occur owing to an optical layout capable of guiding a beam from the side of the head to the eyeball via the reflecting element in front of the eye. Accordingly, a high-quality image can be displayed.

The scanning unit is a device which is manufactured by a semiconductor process and has a reflecting surface driven by mechanical resonance. The optical scanning unit itself can be downsized, scanning can be done at a very high speed, and a smaller-size image display apparatus capable of displaying a fine image can be implemented.

If the beam scanning angle of the scanning unit is enlarged by an optical system made up of an optical element and reflecting element, an image display apparatus capable of observing an image larger than the scanning angle of the scanning unit can be implemented.

What is claimed is:

1. An image display apparatus comprising:
    a scanning unit for scanning a beam by driving a reflecting surface for reflecting a beam from a light source part;
    an optical element having an incident surface which the reflected beam from said scanning unit enters, at least one inner reflecting surface which has a curved surface and reflects the beam coming from the incident surface, and an exit surface from which the beam reflected by the inner reflecting surface emerges; and
    a reflecting element for reflecting the beam emerging from said optical element and guiding the beam to an observer's eye.

2. An apparatus according to claim 1, wherein said scanning unit and said optical element are arranged on a side of the observer's head with respect to said reflecting element positioned in front of the observer's eye.

3. An apparatus according to claim 1, wherein said scanning unit is manufactured by a semiconductor process, and the reflecting surface is driven by mechanical resonance.

4. An apparatus according to claim 1, wherein said scanning unit drives the reflecting surface so as to two-dimensionally reflect the beam.

5. An apparatus according to claim 1, wherein an optical system comprising said optical element and said reflecting element increases a beam scanning angle of said scanning unit.

6. An apparatus according to claim 1, wherein the inner reflecting surface of said optical element includes a rotationally asymmetrical curved surface.

7. An apparatus according to claim 1, wherein the reflecting surface of said reflecting element includes a rotationally asymmetrical curved surface.

8. An apparatus according to claim 1, wherein the reflecting surface of said reflecting element includes a curved surface with a concave surface facing the observer's eye.

9. An apparatus according to claim 1, wherein
    said light source part has a light-emitting member, and a light guide unit for collimating a beam from the light-emitting member and guiding the beam to the reflecting surface of said scanning unit, and
    at least part of the light guide unit is integrated with said optical element.

10. An image display system comprising:
    an image display apparatus including:
    a scanning unit for scanning a beam by driving a reflecting surface for reflecting a beam from a light source part,
    an optical element having an incident surface which the reflected beam from the scanning unit enters, at least one inner reflecting surface which has a curved surface and reflects the beam coming from the incident surface, and an exit surface from which the beam reflected by the inner reflecting surface emerges, and
    a reflecting element for reflecting the beam emerging from the optical element and guiding the beam to an observer's eye; and
    an image information supply apparatus for supplying information about an image formed by scanning of the beam by the scanning unit.

11. An image display apparatus comprising:
    a scanning unit for scanning a beam by driving a reflecting surface for reflecting a beam from a light source part;
    an optical element having a plurality of reflecting curved surfaces which sequentially reflect the beam emerging from said scanning unit; and
    a reflecting element for reflecting the beam emerging from said optical element and guiding the beam to an observer's eye.

12. An apparatus according to claim 11, wherein said scanning unit and said optical element are arranged on a side of the observer's head with respect to said reflecting element positioned in front of the observer's eye.

13. An apparatus according to claim 11, wherein said plurality of reflecting curved surfaces of said optical element include a rotationally asymmetrical curved surface.

14. An apparatus according to claim 11, wherein a reflecting surface of said reflecting element comprises a rotationally asymmetrical curved surface.

* * * * *

UNITED STATES PATENT AND TRADEMARK OFFICE
CERTIFICATE OF CORRECTION

PATENT NO. : 6,657,763 B2
DATED : December 2, 2003
INVENTOR(S) : Shuichi Kobayashi

It is certified that error appears in the above-identified patent and that said Letters Patent is hereby corrected as shown below:

Column 3,
Line 66, "mirror la" should read -- mirror 1a --.

Column 4,
Line 15, "mirror la" should read -- mirror 1a --.

Signed and Sealed this

Twenty-second Day of June, 2004

JON W. DUDAS
*Acting Director of the United States Patent and Trademark Office*